(12) United States Patent
Vertenoeuil et al.

(10) Patent No.: US 10,094,291 B2
(45) Date of Patent: Oct. 9, 2018

(54) GEAR PUMP INTENDED, IN PARTICULAR, AS A HIGH PRESSURE FUEL PUMP

(71) Applicant: SAFRAN AIRCRAFT ENGINES, Paris (FR)

(72) Inventors: Philippe Vertenoeuil, Paris (FR); Bellal Waissi, Vert Saint Denis (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 124 days.

(21) Appl. No.: 15/304,212

(22) PCT Filed: Apr. 14, 2015

(86) PCT No.: PCT/FR2015/051001
§ 371 (c)(1),
(2) Date: Oct. 14, 2016

(87) PCT Pub. No.: WO2015/159018
PCT Pub. Date: Oct. 22, 2015

(65) Prior Publication Data
US 2017/0044986 A1 Feb. 16, 2017

(30) Foreign Application Priority Data
Apr. 15, 2014 (FR) ...................................... 14 53372

(51) Int. Cl.
*F01C 1/18* (2006.01)
*F03C 2/00* (2006.01)
(Continued)

(52) U.S. Cl.
CPC ............ *F02C 7/236* (2013.01); *F01D 25/186* (2013.01); *F04C 2/18* (2013.01); *F04C 11/001* (2013.01);
(Continued)

(58) Field of Classification Search
CPC .......... F02C 7/236; F04C 2/18; F04C 11/001; F04C 11/005; F04C 15/0038;
(Continued)

(56) References Cited

U.S. PATENT DOCUMENTS 2,891,483 A * 6/1959 Murray ............... F04C 15/0026
418/132
3,137,238 A * 6/1964 Gordon ............... F04C 15/0026
418/132
(Continued)

OTHER PUBLICATIONS

Search Report issued in French Patent Application No. 14 53372 dated Jan. 12, 2015.
(Continued)

*Primary Examiner* — Theresa Trieu
(74) *Attorney, Agent, or Firm* — Pearne & Gordon LLP

(57) ABSTRACT

A geared fuel pump (4') operates to supply a determined flow but at low or zero pressure rise. It is planned to add gland packing (46) between support bearings (19) of the pinions (11), or between some of them, to provide hydrodynamic lift for these bearings, by delimiting a closed cavity (47) to provide lift by a fluid with better viscosity properties instead of using the fluid itself that is pumped. Possible application to fuel pumps for aircraft engines, in which the pump (4') is a high pressure pump associated with a low pressure pump.

15 Claims, 6 Drawing Sheets

(51) Int. Cl.
  *F03C 4/00* (2006.01)
  *F04C 2/00* (2006.01)
  *F02C 7/236* (2006.01)
  *F01D 25/18* (2006.01)
  *F04C 11/00* (2006.01)
  *F04C 2/18* (2006.01)
  *F04C 15/00* (2006.01)
  *F04D 1/00* (2006.01)
  *F04D 13/12* (2006.01)
  *F04D 29/047* (2006.01)

(52) U.S. Cl.
  CPC ........ *F04C 11/005* (2013.01); *F04C 15/0038* (2013.01); *F04C 2210/1044* (2013.01); *F04C 2240/30* (2013.01); *F04D 1/00* (2013.01); *F04D 13/12* (2013.01); *F04D 29/0473* (2013.01); *F05D 2220/323* (2013.01); *F05D 2240/53* (2013.01); *Y02T 50/671* (2013.01)

(58) Field of Classification Search
  CPC .......... F04C 2210/1044; F04C 2240/30; F01D 15/286; F04D 1/00; F04D 13/12; F04D 29/0473; F05D 2220/323; F05D 2240/53; Y02T 50/671

USPC .... 418/73, 102, 131, 132, 135, 206.1–206.9
  See application file for complete search history.

(56) References Cited

U.S. PATENT DOCUMENTS

| | | | |
|---|---|---|---|
| 3,528,756 A | | 9/1970 | Norlin |
| 3,574,492 A | | 4/1971 | Schwary |
| 4,787,332 A | | 11/1988 | Geisel |
| 5,417,556 A | * | 5/1995 | Waddleton .......... F04C 15/0026 418/132 |
| 5,641,281 A | * | 6/1997 | Russell ............... F04C 15/0088 418/102 |
| 2014/0003987 A1 | | 1/2014 | Martin-Dye |
| 2015/0204246 A1 | | 7/2015 | Peltier |
| 2015/0377235 A1 | | 12/2015 | Vertenoeuil |

OTHER PUBLICATIONS

International Search Report issued in Application No. PCT/FR2015/051001 dated Jul. 10, 2015.
Written Opinion issued in Application No. PCT/FR2015/051001 dated Jul. 10, 2015.

* cited by examiner

GEAR PUMP INTENDED, IN PARTICULAR, AS A HIGH PRESSURE FUEL PUMP

BACKGROUND OF THE INVENTION

1. Field of the Invention

The subject of this invention is a gear pump designed particularly as a high pressure fuel pump, although other applications are not excluded.

2. Description of Related Art

Aircraft engines include a main fuel pump that is at the heart of their regulation system. They supply fuel to the combustion chamber, by pumping the necessary flow from the tanks. The output flow from these pumps is also used as a hydraulic fluid to actuate actuators, like those used to open air flow discharge gates from the engine core flow to the fan flow.

This pump may comprise two stages, a low pressure pump, and a high pressure pump to which the invention is more specifically applicable. These two stages have distinct functions: the former outputs a pressure increase at imposed flow, and the latter outputs a flow at an imposed pressure difference at its limits. These two stages are usually integrated into the same case, to save space and to simplify the engine, and form a single piece of equipment driven at the same speed by the same shaft. US 2014/003987 A1 describes a two-stage fuel pump illustrating the state of the art.

The most frequently used technology at the present time for the low pressure stage is a centrifugal pump with a blisk. Such a pump has pressure increase characteristics that are strongly dependent on the rotation speed.

The most frequently used technology at the present time for the high pressure stage is a fixed displacement gear pump. Therefore its flow is proportional to its rotation speed, except for the volume output. This technology, used for its high reliability, results in an excess pumped flow at some flight speeds at which the rotation speed is high although there is no longer any need for a flow, to injection in the combustion chamber or to the actuators. This excess flow is then returned to a point upstream from the high pressure pump.

The purpose of new engine developments is to reduce fuel consumption by reducing all energy losses. Thus, according to one purpose of the invention, it is required to significantly reduce or even to eliminate the pressure difference at the limits of the high pressure pump, therefore relying solely on the low pressure pump to achieve the necessary pressure increase. The high pressure pump would be used only to achieve the required flow. The expected savings would then consist firstly of reducing the power necessary to drive the pump shaft, and secondly simplifying the pump, particularly including a reduction in the displacement, because reducing or eliminating the pressure increase generated in it will necessarily reduce all leaks inside it.

Despite these advantages due to the reduction or elimination of the pressure difference, high pressure gear pumps require design modifications that are all aspects of the invention, because this pressure difference between the pump inlet and outlet is used to assure that it is functioning correctly. The pump bearings have to be lubricated and this is usually done by the pumped fluid itself as is explained for example in document U.S. Pat. No. 3,528,756 A: recirculation of the pumped fluid is set up between the outlet side and the inlet side passing through grooves excavated on the bearing, such that the pressure difference between the fluid inlet and outlet forces a recirculation flow through this passage, which maintains a lubrication layer between the bearing and the stubshafts of the pinions that they support. However, the recirculation flow is no longer maintained when the pressure between the two sides of the pump reduces and especially when it becomes negligible. Independently of this flow, the recirculating fluid can be at a pressure that is too low to maintain the hydrodynamic thrust of the gear wheel shafts despite inevitable oscillations of these rotating parts; the shafts can then repeatedly strike the bearings by breaking the hydrodynamic layer, thus damaging the bearings.

Another difficulty is related to another recirculation that must be avoided through which the liquid pumped by the gear mesh leaks on the sides of the gear mesh, with a portion of the pumped liquid returning to the inlet side. Lateral gaps on the sides of the gear mesh have to be severely reduced in order to reduce this damaging recirculation. This is usually done using a floating installation of one of the bearings of each of the pinions in the gear mesh, consisting of a gap between the external periphery of this bearing and the pump casing, such that this mobile bearing can slide in the axial direction to achieve what is called squeezing of the gear mesh. The axially outer face of the mobile bearings (furthest from the pinions) is then made to communicate with the pressure on the outlet side of the pump by drillings formed through the pump for this purpose, which creates a resultant of forces due to pressure pushing the mobile bearings towards the pinions. Once again, this gear mesh squeezing force becomes insufficient if the pressure at the pump terminals reduces. Finally, another harmful recirculation of the fluid from the high pressure to the low pressure occurs around the teeth of the pinions in the gear mesh if there is no large pressure increase, if there is no resultant force transverse to the pinion shafts, which presses the teeth of the pinions close to the low pressure side onto the circular wall of the surrounding case.

Lubrication defects in bearings are avoided in the pump described in document U.S. Pat. No. 4,787,332 A, in which leak tight dams are created between the pinion cavity through which the pumped fluid passes, and lateral cavities surrounding the bearings. Another fluid, specially adapted to lubrication of the bearings, is injected into the lateral cavities. This document relates to a mastic pump or another adhesive pump, that is a completely different fluid from a fuel and in particular is unsuitable for lubrication.

The invention avoids the various pitfalls that can occur following faults in recirculation of the pumped fluid.

BRIEF SUMMARY OF THE INVENTION

According to a first aspect, the invention relates to a geared fuel pump comprising a housing, two pinions meshing with each other in a chamber of the housing, two first bearings each supporting one the two first pinion stubshafts, two second bearings each supporting one of the second pinion stubshafts, the first bearings and the second bearings being housed in the chamber in the case, the first stubshafts turning in the first bearings with first gaps and the second stubshafts turning in the second bearings with second gaps, the first and the second gaps containing fluid hydrodynamic lift layers, characterised in that it comprises gland packing between the second bearings and the gearwheels, said packing isolating closed cavities surrounding the second gaps and delimited by the case, the second bearings and the pinions, the closed cavities containing a fluid different from fluid that is a fuel pumped by the pinions.

This aspect of the invention is justified as follows. Lubrication by hydrodynamic lift is necessary in this type of pump for reasons of safety or service life, since static lubrication on bearings with a smooth or porous surface is unacceptable, but hydrodynamic lift may become insufficient if done by recirculation of the pumped fluid inside the pump according to a standard design, if the pressure difference at the pump limits is too low. In particular, oscillations of pinion shafts leading to movements on bearings would no longer be sufficiently damped. However, it has been determined that hydrodynamic lift by recirculation remained acceptable to satisfy the reasons above if it was applied and maintained by only one of the bearings of each of the pinions, called the first bearings in this description.

The second bearings have to be lubricated like the first bearings. In general, lubrication assures the service life by limiting wear and evacuating heat, and also the stability of rotating pinions against oscillations of their shaft due to damping inherent to any relatively stiff pumped fluid layer. The second bearings use a first innovation of the invention described below, to assure lubrication and stability of the rotating pinions and therefore prevent any movement of the pinion rotating in the bearings. In this description, it is considered that the stability of the pinion can be achieved by the second bearings alone, due to the very small operating gaps in the pump. For the first bearings, since it is then no longer necessary to provide lubrication to assure the service life, another less complex innovation can be implemented, consisting simply of a new innovative recirculation described below and that guarantees that hydrodynamic lift is maintained even when there is no pressure difference at the pump limits. The second bearings can then apply hydrodynamic lift without recirculation by means of a fluid contained in closed cavities, that can be chosen to be different from the fuel and with properties and particularly viscosity such that a hydrodynamic lift layer can be created more easily than with the pumped fluid, for example if it is rheo-thickening. Rheo-thickening fluids have the property that this layer is formed for all pump pinion rotation speeds, even when there is no extra pressure at the pump limits. Therefore sufficient support of gear pinions is provided by the second bearings alone associated with closed cavities, even in the presence of oscillations, while recirculation through the first bearings that guarantees that the pump outputs a flow at a pressure difference, provides the necessary operating reliability.

A second aspect of the invention relates to setting up the pinion squeezing force in the axial direction, to prevent recirculation of the pumped fluid at their lateral face, even if the pressure difference at the pump limits is not sufficient to create this squeezing.

According to the second aspect of the invention, springs are compressed between the case and the external axial faces at a distance from the pinions, of the second bearings; springs extend over opposite portions of the circumference of said faces and therefore apply a higher resultant force to thus reinforce squeezing of the pinions between their bearings, essential to reduce recirculation leaks within the pump. It will be seen that this arrangement of springs is not used in known pumps of this type.

Thus as we have seen, the invention becomes useful especially with pumps with low or even zero additional pressure. However, recirculation through the first bearings no longer takes place if this pressure difference becomes too low. This situation occurs in the case of fuel supply circuits when the gear pump is on the output side of other pumps that create a fluid pressure difference. It is then possible to create a recirculation path from the pump through the different bearings of this pump, leading to a low pressure region of the supply circuit. The disadvantages of a completely stand-alone pumping circuit and a fluid different from the pumped fluid are avoided by using the pumped fluid both for recirculation and a low pressure zone already present in the device to generate the flow.

BRIEF DESCRIPTION OF SEVERAL VIEWS OF THE DRAWING

The different aspects, characteristics and advantages of the invention will now be described in detail, including those mentioned above and others, with reference to the following figures.

DETAILED DESCRIPTION

We will now describe the first figures.

Figure 1:
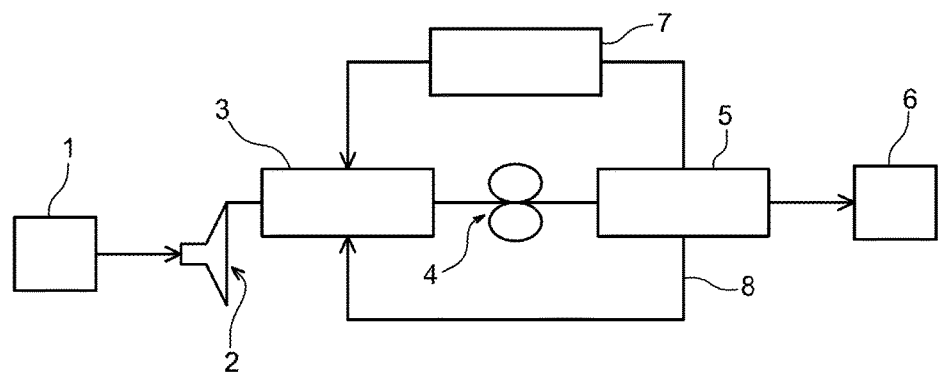
FIG. 1 is an overview of a device in which the pump according to the invention can be placed.

FIG. 1 shows a fuel circuit of an aircraft engine. An aircraft tank 1 supplies a low pressure pump 2, then and a high pressure pump 4 through filters and exchangers 3. The pressurised fuel is supplied to a proportioning pump 5 that supplies a combustion chamber 6, actuators and servo-valves 7; the excess flow returns upstream from the high pressure pump 4 through a return conduit 8 as does the fluid used in the actuators and servovalves 7.

The device is not limitative of the invention that relates to a special pump, particularly useful in this application and this device, but perfectly applicable to others.

Figure 2:
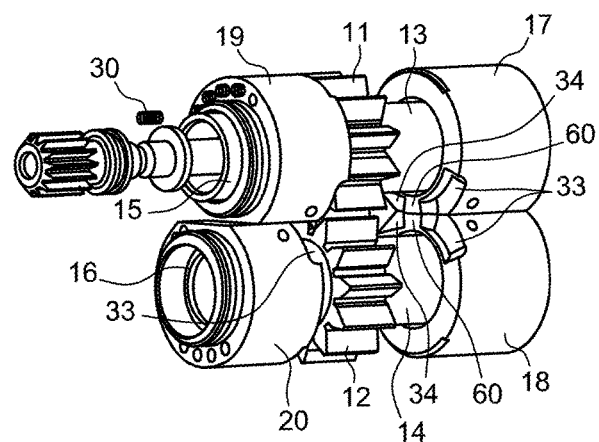
FIGS. 2, 3, 4, 5 and 6 are various views of a known pump of the type improved by the invention.
Figure 3:
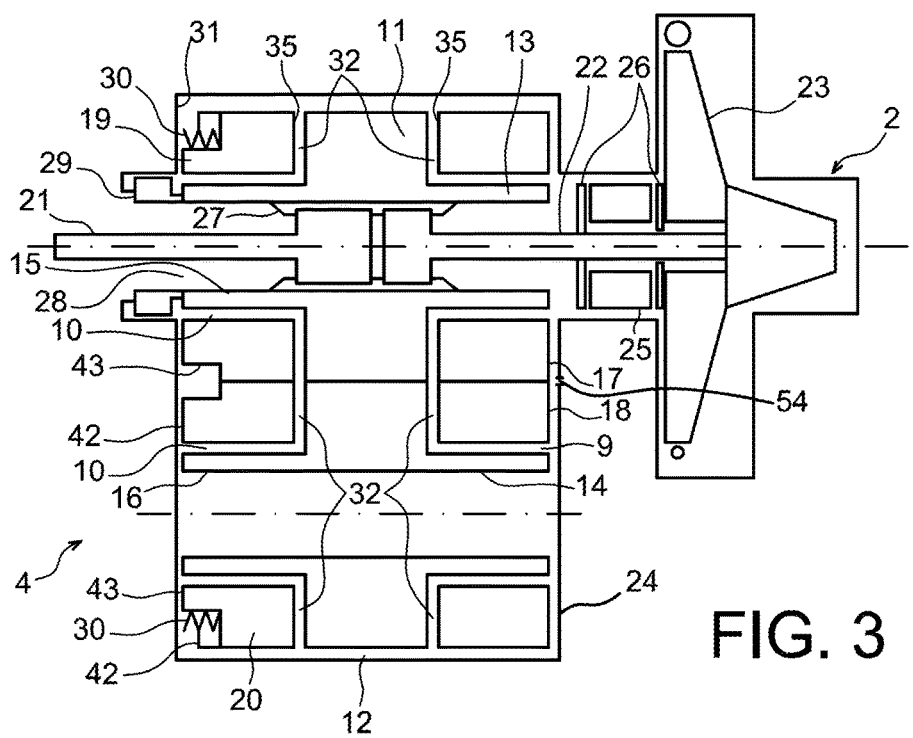

FIGS. 2 and 3 will now be commented on.

FIG. 2 illustrates a perspective view of essential portions of the known high pressure pump 4 that is to be improved by the invention, and FIG. 3 is a general layout drawing of the device. The high pressure pump 4 is a gear pump comprising a driving pinion 11 and a driven pinion 12, that mesh together and discharge fuel between their teeth to achieve pumping. Each of the pinions 11 and 12 comprises stubshafts 13, 14 and 15, 16 at its two opposite sides, the first of which at the right in FIGS. 2 and 3 are supported by first bearings 17, 18 respectively, called fixed bearings with first gaps 9, and the second at the left on the figures are supported by second bearings called mobile bearings 19, 20 with second gaps 10. These bearings 17 to 20 are all smooth bearings, but the fixed bearings 17 and 18 are retained with a smaller gap in the housings of a case 24 than the mobile bearings 19 and 20, that can thus be displaced in the axial direction to squeeze the pinions 11 and 12 and reduce gaps that could enable recirculation of the pumped fluid towards low pressures. The driving pinion 11 is driven by a high pressure shaft 21, and a low pressure shaft 22 drives the blisk 23 of the low pressure pump 2. Pumps 2 and 4 are both contained within the common case 24. The low pressure shaft 22 is supported by an additional bearing 25 in a reaming in the case 24. Thrust bearings 26 limit axial movements of the blisk 23, that bears on the bearing 25. The movement of the drive shaft 21 is forwarded to the low pressure shaft 22 by means of splines 27 between the driving pinion 11 and the ends of shafts 21 and 22. Pumps 2 and 4 are thus coupled together.

Good operation of the high pressure pump 4 depends on a sufficiently good seal between its different elements: it is essential to limit leaks of pumped fluid outside the case 24, and also around the pinions 11 and 23 in recirculation to the inlet of pump 4. The case 24 is open at 28 around the entry of the high pressure shaft 21. Gland packing 29 is provided at this location between the case 24 and the adjacent stubshaft 15, to eliminate leaks to the outside. Leaks by recirculation around pinions 11 are 12 are minimised by springs 30 to push the mobile bearings 19 and 20 towards the pinions 11 and 12, which is referred to as squeezing of the pinions 11 and 12.

Another criterion for satisfactory operation of the high pressure pump 4 will now be described with reference to FIGS. 4 and 5. Friction between bearings 17 to 20, pinions 11 and 12 and their stubshafts 13 to 16 are avoided by fluid hydrodynamic lift layers formed by recirculation of the pumped fluid. Several relief patterns are excavated in each bearing 17 to 20, including a high pressure dish 33 and a low pressure dish 34 at the periphery of the inner axial face 35 (close to pinions 11 and 12), on each side of a separation flange 60. The dishes 33 and 34 are in communication with adjacent fluid volumes at the inlet and outlet to pump 4. The high pressure dish 33 communicates with a curved high pressure groove 36 that opens up on its inner axial face 35, and on a high pressure groove 37 through a drilling not shown, that opens up on an inner radial face 38 of bearings 17 to 20. A low pressure groove 39 extends to the junction of the inner axial face 35 and the inner radial face 38 and communicates with the low pressure dish 34 through a collective groove 40. In bearings 17 to 20 made in this manner, operation of the pump thus maintains fluid circulation from the high pressure dish 33 to the low pressure dish 34, providing dynamic lubrication of bearings 17 to 20 by creating hydrodynamic layers on the inner axial face 35 and the inner radial face 38. Therefore stubshafts 13 to 16 are supported by these hydrodynamic layers in the inner radial faces 38 that occupy gaps 9 and 10, and the hydrodynamic layers on the inner axial faces 35 form adjacent to the flanks of the pinions 11 and 12, holding them slightly separated from bearings 17 to 20 and therefore preventing the gaps 32 from being entirely closed, despite the springs 30.

Figure 5:
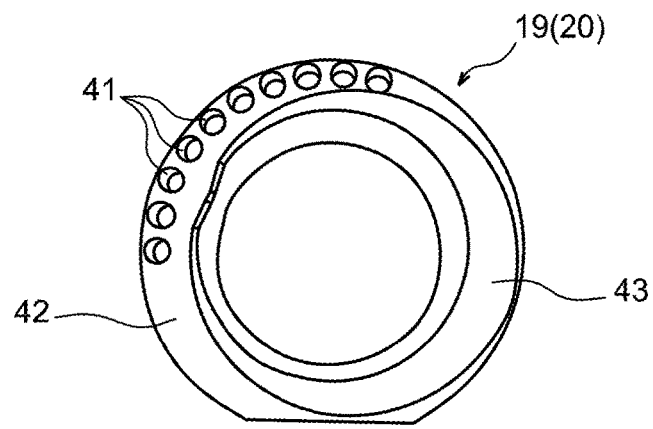
Figure 6:
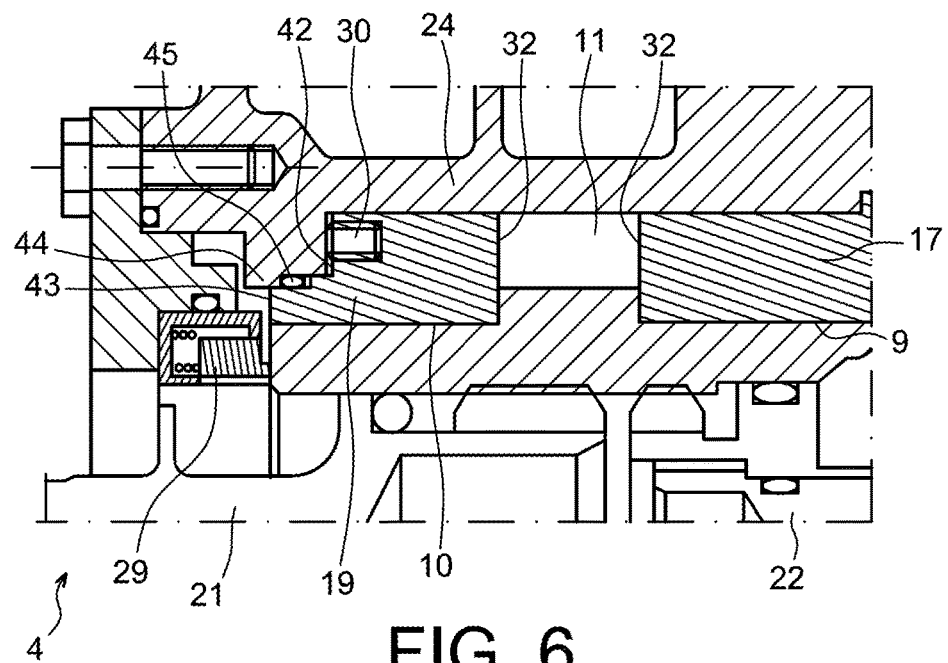

Thus as shown on FIG. 5, the mobile bearings 19 and 20, in their known construction, have a special construction feature at their outer axial face remote from pinions 11 and 12: this face is divided into two crescent shaped portions 42 and 43 that are located in different planes, separated by a shoulder fitted with a seal 45 (visible in FIG. 6) that exposes the crescent 42 to high fluid pressure and crescent 43 to low pressure. The mobile bearings 19 and 20 are held in place at the shoulder separating the crescents 42 and 43, in reamings 44 in the case 24, offset from the rotation axes of the pinions 11 and 12. Springs 30 compressed between the mobile bearings 19 and 20 and one face 31 of the case 24 adjacent to the inlet of the high pressure shaft 21, can be installed only where the crescent 42 is largest, over approximately a quarter of the circumference of the mobile bearings 19 and 20. The thrust in the axial direction is then unbalanced and comprises a moment about a transverse axis of the mobile bearings 19 and 20, so as to balance an opposing moment created by pressure differences in the pumped fluid on the inner axial faces 35: therefore there is no tilting of the mobile bearings 19 and 20 about this axis, so that they remain coaxial with the stubshafts 15 and 16 that they support, despite assembly gaps of the mobile bearings 19 and 20 in the case 24.

Forces due to pressure exerted on participating elements inside the pump (the mobile bearings 19 and 20, and the pinions 11 and 12 and their stubshafts) can be described in detail largely as follows. The pressure difference between the pump inlet and outlet shifts the pinions 11 and 12 towards the fluid inlet, moving them towards the case 24, applying a transverse force on the stubshafts 13 to 16. The higher pressure applied on the outer axial face of the mobile bearings 19 and 20, mainly on the crescent 42 exposed to high pressure, pushes the mobile bearings 19 and 20 towards the pinions 11 and 12 and presses them onto bearings 17 and 18, leaving only a smaller gap 32 around the pinions 11 and 12, that are held in place by fluid recirculation on the inner axial faces 35. Furthermore, the asymmetry of these external axial faces due to the irregularity of crescents 42 and 43 is such that the fluid pressure applies a tilting movement onto the mobile bearings 19 and 20, that compensates for an opposite tilting movement produced by irregular fluid pressure on the inner axial faces adjacent to the pinions 11 and 12: this balancing of tilting movements enables the mobile parts 19 and 20 to slip in the case 24 without excessive friction and therefore allows them to move.

The springs 30 that also contribute to squeezing of the pinions 11 and 12 are useful for starting the pump 4 before any pressure difference has been created there; the forces that they create are then two weak to exert any real influence.

Therefore operation of the high pressure pump 4 is generally satisfactory, but it depends on a sufficient pressure increase to lubricate bearings 17 to 20 and to maintain hydrodynamic lift of the stubshafts 13 to 16, despite operational vibrations and also to reduce harmful recirculation around pinions 11 and 12. Another possible weakness is due to the gland packing 29 that closes off the case 24. However, the implementation of the invention that will now be described in a purely illustrative manner, enables satisfactory operation even if the additional pressure at its limits is low or zero. We will describe the invention through modifications made to the high pressure pump 4. The modified high pressure pump characteristic of the invention will be assigned reference 4'.

Figure 7:
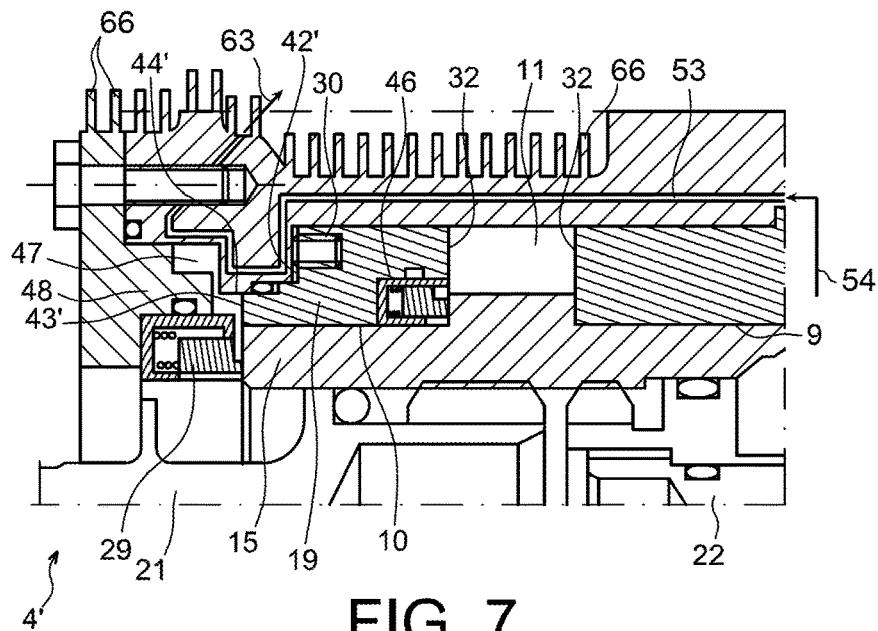
FIG. 7 illustrates a first modification of this pump, characteristic of the invention.

With reference to FIG. 7, it can be seen firstly that a second gland packing 46 has been added between the mobile bearing 19 and the driving pinion 11, so as to interrupt the axial gap 32 at this location. The second gland packing 46 consists of a housing containing a spring that pushes against a lip that provides the seal: in this case the housing is in a recess in the mobile bearing 19 and the lip rubs against a smooth surface of the pinion 11. A similar seal is placed at the corresponding location between the mobile bearing 20 and the driven gear 12, although the layout is not shown because it is similar. It can be seen that a closed cavity 47 is formed, delimited by the case 24, the mobile bearing 19 or 20, the gland packing 46, the pinion 11 or 12, the stubshaft 15 or 16, and an end plate 48 forming part of the case 24 and in which the gland packing 29 is inserted. In the case of the mobile bearing 20 and the driven pinion 12, the same applies if there is no seal 29 and end plate 48 because the case 24 is continuous at this location.

Figure 8A:
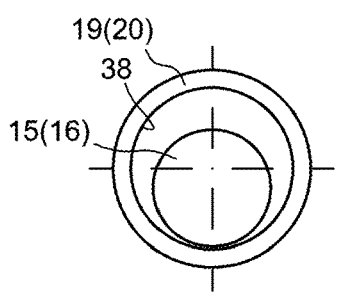
FIGS. 8A, 8B, 8C, 8D and 9 describe the advantages of this modification.
Figure 8B:
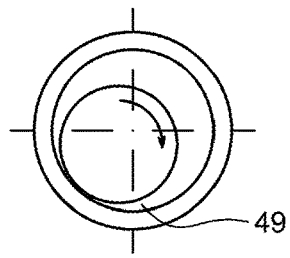
Figure 8C:
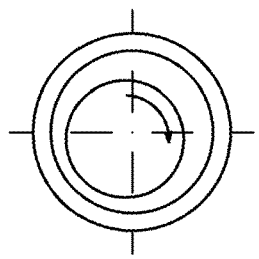
Figure 8D:
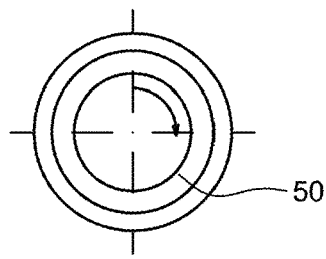

The reason for creating the closed cavities 47 will now be described. There is a relatively large radial gap between stubshafts 13 to 16 and bearings 17 to 20, the layout at rest being shown on FIG. 8A in which the stubshafts 13 to 16 are placed at the bottom of the inner radial faces 38. As the high pressure pump 4' is started up, a hydrodynamic wedge 49 is created on stubshafts 13 to 16 (FIG. 8B), it detaches them completely from the inner radial face 38 when the rotation speed is sufficiently high (FIG. 8C), and the stubshafts 13 to 16 are at the centre of the high speed bearings 17 to 20, the hydrodynamic wedge having been replaced by a uniformly thick hydrodynamic layer 50 (FIG. 8D). However, formation of this hydrodynamic wedge 49 and then this hydrodynamic layer 50 depend on fluid properties: it is only formed easily at high pressure with the most frequency encountered fluids (Newtonian) such as fuels. Therefore the hydrodynamic layer 50 can no longer form easily if the fluid remains at approximately the same pressure between the inlet and outlet of the high pressure pump 4'. Oscillations applied to the pinions 11 and 12 then tend to maintain the unfavourable state in FIG. 4B, in which the bearings 17 to 20 are exposed to damage by shocks, even at high rotation speeds.

Figure 9:
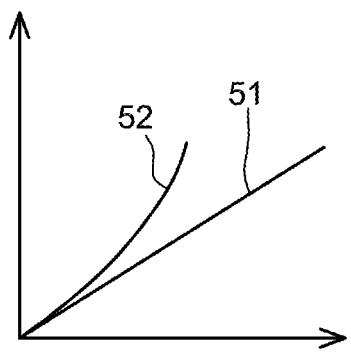

This is why pumped fluid is no longer used for formation and maintenance of the hydrodynamic layer 50, but a special fluid is used instead that is previously injected into the closed cavities 47: this is a non-Newtonian fluid called a rheo-thickening fluid, in other words its viscosity increases as a function of the shear rate (the shear rate being the speed gradient in the fluid). As indicated in FIG. 9 in which shear rates are plotted on the abscissa and shear stresses are plotted on the ordinate, Newtonian fluids follow a straight line 51 for which the slope (the fluid viscosity) is constant regardless of the shear rate. Rheo thickening fluids follow a curve 52, the slope of which becomes increasingly steep as the shear rate increases, and therefore the viscosity increases as the applied shear rate increases. Examples of such fluids are oils containing impurities, for example such as organic fibres. Their viscosity is higher when shear rates are higher, which makes hydrodynamic lift easy to achieve. These high shear conditions always occur in this situation because they exist in the hydrodynamic wedge 49 at the beginning of rotation or in case of oscillations since the velocity gradient is high due to the thinness of this wedge; and the shear rate is equally important at high rotation speeds once the hydrodynamic layer 50 has been formed. All that is necessary is to provide this special fluid for only two of the bearings 17 to 20, for example the mobile bearings 19 and 20, the fixed bearings 17 and 18 continuing to benefit from lift by the pumped fluid. Hydrodynamic lift by recirculation is necessary with this type of pump due to its reliability, since sufficient lubrication is guaranteed provided that the high pressure 4' is in operation and is supplied. However, it has been observed that the supply can be made to a single bearing per pinion 11 or 12, which explains this feature by which the closed cavity 47 is only provided at the side of the mobile bearings 19 and 20. Therefore classical hydrodynamic lift by recirculation is kept for the fixed bearings 17 and 18. On the contrary, the lift achieved by the fluid in the closed cavities 47 plays an overriding role in damping of oscillations during irregular operation. Note that an opposite arrangement could have been chosen, namely in which the closed cavities are on the side of the fixed bearings 17 and 18.

We will now describe other aspects of the invention. Their usefulness will become apparent in situations in which the pressure difference between the outlet and inlet of the high pressure pump 4' become low or even zero.

Figure 10:
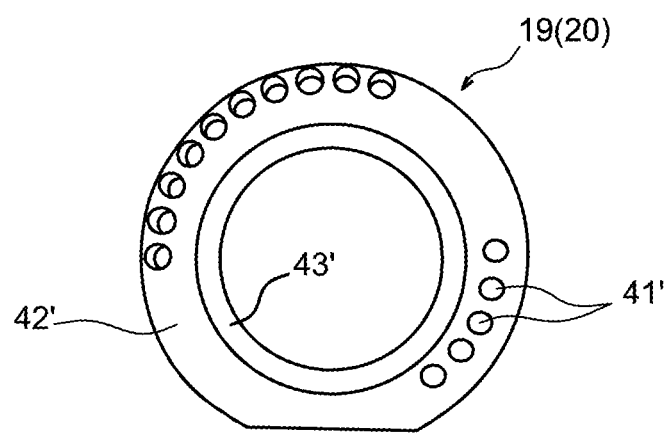
FIGS. 10 and 11 illustrate other modifications characteristic of the invention.

A second aspect of the invention is described with reference to FIG. 10. The squeezing force of the pinions 11 and 12 in the axial direction might become insufficient if there is no pressure difference. This is corrected by placing additional springs 30 similar to the previous springs, each in a new compartment 41', formed on a sector of the circumference of the mobile bearing 19 or 20 opposite the sector containing the compartments 41. This requires that the existing offset reaming 44 is modified, replacing it by a reaming 44' concentric with the axis of the bearing 19 or 20. The portions 42' and 43' under high pressure and low pressure from the external axial face of the mobile bearings 19 and 20 are now concentric. Therefore the pinions 11 and 12 are squeezed essentially or even completely by springs 30, which is not a problem despite the weakness of these springs since the pressure difference causing recirculation around the pinions 11 and 12 in gaps 32 is no longer high and a low squeezing force is now sufficient to overcome it. Similarly, there is no longer any reason to apply a moment about an axis transverse to the mobile bearings 19 and 20, since they are no longer subject to tipping caused by forces due to pressure on their inner axial faces 38.

Figure 11:
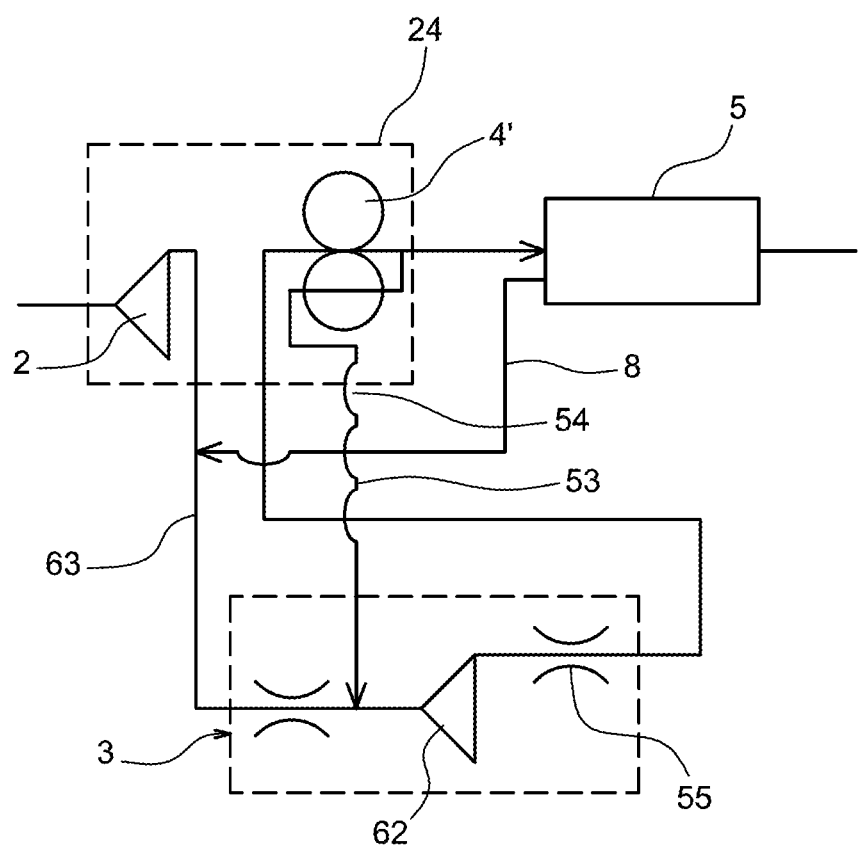

If the reduction in the pressure difference at the limits of the high pressure pump 4 is excessive, it may be insufficient to achieve recirculation in the fixed bearings 17 and 18. Classical recirculation from the outlet side to the inlet side of the pump is then replaced by external recirculation in accordance with a third important aspect of the invention shown in FIG. 11. In this case a conduit 53 is created between a tapping 54 in the case 24 on the side of the outer axial faces of the fixed bearings 17 and 18 at a distance from pinions 11 and 12, and a point in the fuel circuit upstream from the high pressure pump 4' to which the applied pressure is lower, for example on the upstream side of a feed pump 62 that can be added to the device downstream from the low pressure pump 2 to compensate for the pressure increase created by the known high pressure pump 4. For example, this feed pump 62 is located upstream from the filter 55 of the filters and exchangers 3. The fluid conduit passing sequentially through the low pressure pump 2, the feed pump 62, and the high pressure pump 4' is marked with reference 63. The high pressure pump 4' supplies a flow only, without adding any additional pressure.

Figure 4:
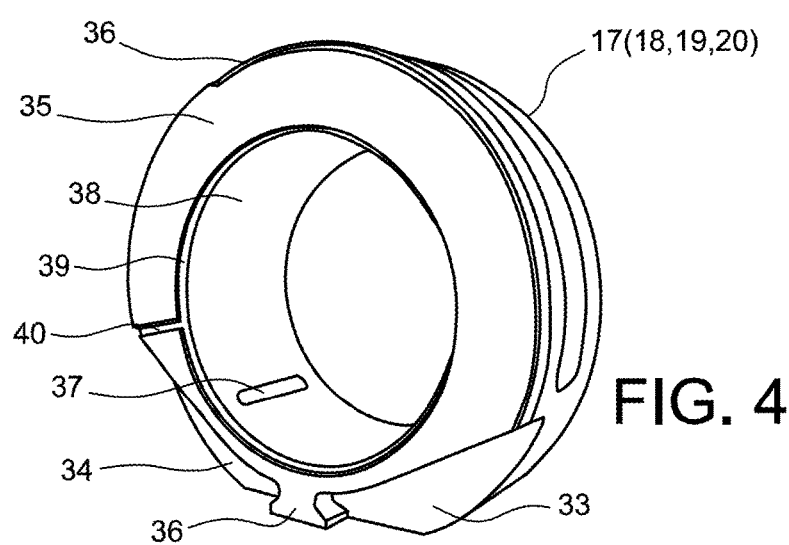

The bearings associated with the closed cavities 37, in this case the mobile bearings 19 and 20, do not have any dishes, grooves, etc. as shown in FIG. 4 because they are not lifted by the pumped fluid: they may have a regular cylindrical shape, or they may possible have grooves providing better communication with the closed cavities 47 and the interfaces with stubshafts 15 and 16. The fixed bearings 17 and 18 may also be modified in the case of external recirculation in FIG. 11, the collecting groove 40 for example leading directly to the tapping 54 of the case 24.

Another consideration relates to the gland packing 29 leading to the exterior. The fluid in the closed cavities 47 will usually be at moderate pressure, less than the pressure of fluid pumped at the aircraft cruising speed. Therefore the pressure applied to the gland packing 29 will be lower and the packing will be less subject to leaks. If leaks occur anyway, they would probably be less dangerous than fuel leaks. Furthermore, leaks in the opposite direction towards the chamber 24 will not occur because the fuel is at a higher pressure. In any case, the higher viscosity of the fluid in the closed cavities 47 makes leaks more unlikely.

Fins 66 can be added to the case 24 close to the closed cavities 47, and also the fuel return duct 53 to the moderate pressure can circulate around said closed cavities 47, to improve removal of heat produced by their contents into ambient air or into the recirculating fuel. These two designs are both shown together in FIG. 7: therefore the conduit 53 starting from the tapping 54 is firstly excavated from the case 24 and passes close to closed cavities 47, possibly winding around them, and then exits from the case 24. The conduit 53 may be integrated into the case 24 machined by drilling, or formed by assembling several parts of the case 24. The length of the conduit 53 in the case 24 can be increased to dissipate more heat in it, before the recirculating fluid reaches the fluid conduit 63. The fins 66 may be added on the entire external surface of the case 24, and their density may be higher close to the closed cavities 47. In this description, they have been presented as covering the entire surface of the case 24 starting adjacent to pinions 11 and 12, however there are none on the plane face of the end plate 48.

Therefore the pump according to the invention improves operation of existing fuel supply circuits, it is easily integrated into these circuits with only minor necessary modifications, without significantly increasing the complexity and with excellent reliability.

The invention would remain applicable to pumps for which the first bearings or fixed bearings 17 and 18 and the second bearings or mobile bearings 19 and 20 are fixed to each other and joined by a spacer, and in this case the mobile bearings 19 and 20 move together.

What is claimed is:

1. A gear fuel pump comprising a housing, two pinions meshing with each other in a chamber of the housing, two first bearings each supporting one of two first stubshafts of the pinions, two second bearings each supporting one of two second stubshafts of the pinions, the first bearings and the second bearings being housed in the chamber in the housing, the first stubshafts turning in the first bearings with first gaps and the second stubshafts turning in the second bearings with second gaps, the first and the second gaps containing fluid hydrodynamic lift layers, wherein gland packing is disposed between the second bearings and the pinions, said gland packing isolating closed cavities surrounding the second gaps and delimited by the housing, the second bearings and the pinions, the closed cavities containing a fluid different from a fluid, that is a fuel, pumped by the pinions.

2. The gear fuel pump according to claim 1, wherein viscosity properties of the fluid in the closed cavities are different from viscosity properties of the fuel.

3. The gear fuel pump according to claim 1, wherein the fluid in the closed cavities is rheo-thickening.

4. The gear fuel pump according to claim 1, wherein either the first bearings or the second bearings are free to move in the housing along an axial direction of the pinion stubshafts and are pushed towards the pinions by the compressed springs onto the housing.

5. The gear fuel pump according to claim 4, wherein the springs extend over opposite sectors on circumference of outer axial faces of either the first bearings or the second bearings that are free to move in the housing.

6. The gear fuel pump according to claim 1, wherein the housing comprises gland packing at one opening, the gland packing surrounding a pump shaft and opening up onto one of the closed cavities.

7. The gear fuel pump according to claim 1, wherein the hydrodynamic lift layers of the first gaps are composed of circulation means of the fluid pumped by the pump, said circulation means passing through said first gaps.

8. The gear fuel pump according to claim 7, wherein the housing includes a tapping making the first gaps communicate with outside the housing.

9. The gear fuel pump according to claim 8, wherein the gear fuel pump is coupled to a second pump also contained in the housing, and wherein the gear fuel pump is a high pressure fuel pump, said second pump being a low pressure fuel pump with a fuel outlet connected to a fuel inlet of the gear pump through a fluid circuit, the tapping is connected to the fluid circuit between said fuel outlet and said fuel inlet, through a fluid conduit.

10. The gear fuel pump according to claim 9, wherein the conduit comprises a portion internal to the housing and passing close to the closed cavities.

11. The gear fuel pump according to claim 1, wherein it is coupled to a second pump also contained in the housing, the gear pump and said second pump having drive shafts connected to each other.

12. The gear fuel pump according to claim 11, wherein it is a high pressure fuel pump, said second pump being a low pressure fuel pump with a fuel outlet connected to a fuel inlet of the gear pump through a fluid circuit.

13. The gear fuel pump according to claim 1, further comprising heat dissipation fins on the housing, at least in front of the closed cavities.

14. A pumping device comprising a gear pump according to claim 1, the gear pump being a high pressure pump, the device also including a low pressure pump, and a fluid conduit passing through the low pressure pump and the high pressure pump.

15. The pumping device according to claim 14, further comprising a feed pump, through which the conduit passes downstream from the low pressure pump, the housing including tappings that make the first gaps communicate with outside the housing, and the tappings being connected to another conduit leading to the conduit upstream from the feed pump.

* * * * *